UNITED STATES PATENT OFFICE.

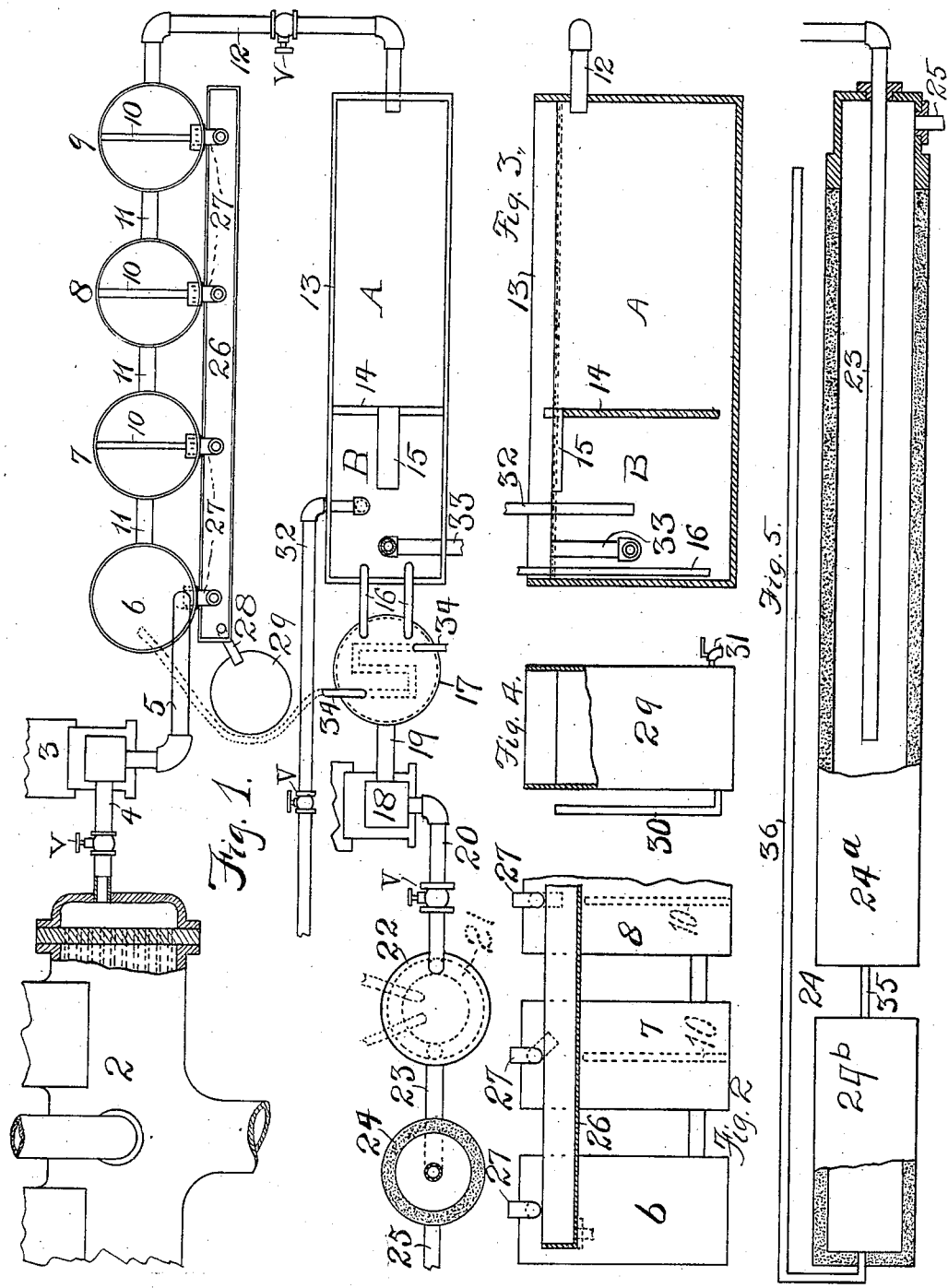

AMOS ANDREWS, OF PLAINFIELD, NEW JERSEY.

OIL AND CONDENSED-STEAM SEPARATOR.

SPECIFICATION forming part of Letters Patent No. 627,793, dated June 27, 1899.

Application filed November 29, 1898. Serial No. 697,732. (No model.)

*To all whom it may concern:*

Be it known that I, AMOS ANDREWS, a citizen of the United States, and a resident of Plainfield, in the county of Union and State of New Jersey, have invented a certain new and useful Method of and Means for Separating Oil from Condensed-Steam Feed-Water, of which the following is a specification.

Many steam plants are so situated as to be compelled to use a feed-water containing foreign substances either in solution or suspension, or even both, thus leading to the formation of scale and the like in the boilers. Condensing the steam and using the water as feed-water does not wholly avoid the difficulties, since cylinder-oil is carried over by the steam and is fed to the boiler with the water, thus leading to the formation of scale in the boiler or causing the same to be burned through oil getting on the fire-sheets. Moreover, more or less fresh feed-water has to be introduced to supply the losses due to leakage and blowing off through the safety and other valves, thus compounding the scale. These are all known difficulties, and many efforts have been made to overcome them.

One object of the present invention is, in a condensing-engine plant, to secure purity of the condensed steam or water before it is returned to the boiler, thus minimizing the formation of boiler-scale, increasing the life of the boiler, and reducing the amount of fresh water used. Another object is to reclaim the cylinder-oils for reuse, and other objects, as a reduction of the amount or quality of fuel used, as will hereinafter more fully appear.

To these ends the invention includes the method and the apparatus hereinafter more fully described, and more particularly pointed out in the claims concluding this specification.

The preferred form of the invention is illustrated in the accompanying sheet of drawings, forming part of this specification, in which—

Figure 1 is a diagrammatic plan showing an arrangement of apparatus suitable for carrying out the invention. Fig. 2 is a side elevation, partly in section, of part of the apparatus shown in plan in Fig. 1. Fig. 3 is a like view of another part of said apparatus. Fig. 4 is a side view, partly in section, of an oil-catching tank or barrel, also shown in plan in Fig. 1. Fig. 5 is a side view, partly in section, of an oil-separator, also shown in horizontal section in Fig. 1.

The same part will be found designated by the same numeral or other character of reference in the various views of the drawings.

As the invention may be best understood if described in conjunction with an apparatus for carrying it into effect, I will proceed to the description of an apparatus suited to the purposes in view.

The steam from the engine is taken to and condensed in a suitable form of condenser, preferably a surface condenser 2. From thence the water is drawn by a vacuum-pump 3, through a pipe 4, and is delivered through a pipe, as 5, into a tank or vessel having vertically-disposed bafflers arranged to direct the fluid up and down alternately. The vessel for this purpose, which is shown in the drawings, comprises four cylindrical open-topped tanks 6 7 8 9, of which each of the last three is provided with a partition 10, reaching from the bottom to a point about three-fourths the way to the top of the tank, the tank 6 being without such partition or baffler, and the tanks 6 7 8 9 being connected in that order by means of short pipes 11 near their bottoms and being arranged on a common level, thus forming a single vessel in so far as this invention is concerned. The water flows from tank 6 into tank 7 and up over the partition 10 in tank 7 and through a pipe 11 into the tank 8 and up over partition 10 in tank 8 and likewise into tank 9 and over its partition 10. The sides of tanks 6 7 8 9, where they are connected by pipes 11, may be called "bafflers" arranged to direct the water downwardly, while walls 10 are bafflers arranged to direct the water upwardly. The upward motion of the oily water facilitates the separation of the oil and the water. The oil floats, while the water flows on through the pipes. A pipe 12 leads from near the bottom of tank 9 to near the top of a long tank 13 on the same level as tanks 6 to 9, preferably. The tank 13 is provided with a cross-partition 14, preferably a little higher than the normal level of water in the tank, and also open at the bottom. The top of partition 14 is provided with a trough 15, extending into that part of the tank 13 farthest from the inlet from pipe 12. Pipes 16 connect tank 13 with another tank 17, which I will call a "condenser-tank" for convenience and for a reason presently to appear. These pipes 16 may siphon the water over from tank 13 to tank 17. A feed-pump 18 draws the water from condenser-tank 17 through a pipe 19 and delivers the water through another pipe 20 into a coil of pipe 21 in a shell 22, whence the water is forced into a pipe 23 bent upwardly and terminating with an open end well up and inside a closed oil-separator 24. From the bottom of separator 24 a pipe 25 connects with a boiler. (Not shown.) Preferably the separator is covered with asbestos or other non-conductor.

The foregoing apparatus constitutes a means whereby the condensed steam is returned to the boilers and whereby oil contained in the water may be separated from the same. Means for collecting the oil will now be described.

Alongside the tanks 6 7 8 9 is a trough 26, and each tank is provided with a revoluble elbow-pipe 27, which can be turned, so as to have its end up above the water-level in the tanks and also can be turned to have the end below such level, (or suitable cocks may replace the elbows.) The function of the elbows is when turned down over trough 26 to draw off the oil that floats on the top of the water in the tanks. The separation of the oil and water in tanks 6, 7, 8, and 9 is greatly facilitated by the agitation due to the inflow and the up-and-down course of the water through the tanks. The oil drawn off from the tanks contains some water and the whole flows from trough 26 by a pipe 28 into a barrel or tank 29 on a lower level. When a sufficient amount of the oil and water has accumulated in tank 29, the water is drawn off by means of an elbow (revoluble) 30 and afterward the oil may be drawn off through a cock 31.

I prefer to introduce extra feed-water into the part B of tank 13 or through a pipe 32, whence the cold water flows gently under the partition 14 into the part A. As the extra water warms up it rises and mingles with the water coming in through the pipe 12. An oily residue collects from the water in tank 13 and flows through trough 15 and out through the waste-pipe 33 to a sewer or other like discharge.

The drip-pipes of a steam-heating system for a building in which the steam plant may be situated may be run through a tank, as 17, in order to condense the steam and to heat up the feed-water. I show such pipes 34 as passing through tank 17 and extending to tank 6, where they discharge.

The oil-separator 24 is preferably formed in two parts $24^a$ and $24^b$, which are in communication with each other, as by a narrow orifice or a small pipe 35 and the part $24^b$ being vertically over part $24^a$ and each being closed except for the described piping and the pipe 36, extending from the top of part $24^b$ to near the floor-line or bottom of part $24^a$. The heavy oils, commonly called "bull's liver oil," are carried over, at least in large part, to the separator 24. The heating received in tank 17 or in shell 22 (through which one or more auxiliaries may exhaust to the condenser 2) leads to a separation of these heavy oils from the water in separator 24, the temperature being about 200° Fahrenheit or over, and the oils rise through pipe 35 into the part $24^b$, whence they are drawn off through the pipe 36, and are thus prevented from passing to the boiler. It is these heavy oils that lead to the formation of much of the objectionable scale in the boilers, at least where the water is hard, and I find that the separation of the oil from the water in the manner hereinbefore described leads to a large decrease in the amount of scale formed in the boilers, even when the extra feed-water is very hard. Much of the oil recovered is of a light flaky character and on standing in a warm place for several hours is converted into good oil, which after straining is ready for use.

By the use of my invention a relatively pure feed-water is obtained without the use of filters, preparations for use in the boiler to prevent scale or incrustations, or the like. Incidentally a large percentage of the cylinder-oil is recovered for use, mostly in the tanks 6, 7, 8, and 9. Another result is that the small amount of scale (relatively speaking) that does form in the boiler is more easy of removal than that formed when my invention is not used.

I do not limit myself to the precise form of my invention shown in the drawings and hereinbefore described, since the invention may be embodied in many other forms without departing from the spirit thereof.

What I claim is—

1. In a condensing-engine plant, the combination of a vacuum-pump, a vessel having vertically-disposed bafflers arranged to alternately direct the course of the fluid up and down and connected at one end with said pump, means for drawing off fluid from near the top of said vessel, and a feed-pump connected with said vessel, with a vertically-arranged oil-separator comprising two communicating chambers one over the other, substantially as described.

2. In a condensing-engine plant, the combination of a vacuum-pump, a vessel having vertically-disposed bafflers arranged to alternately direct the course of the fluid up and down and connected at one end with said pump, means for drawing off fluid from near the top of said vessel, a tank connected with said vessel, a residue-outlet from said tank arranged to take fluid from near the top thereof, and a feed-pump connected with said tank independently of said residue-outlet, substantially as described.

3. In a condensing-engine plant, the combination of a vacuum-pump, a vessel having vertically-disposed bafflers arranged to alternately direct the course of the fluid up and down and connected at one end with said pump, means for drawing off fluid from near the top of said vessel, a tank connected with said vessel, a residue-outlet from said tank arranged to take fluid from near the top thereof, and a feed-pump connected with said tank, with an oil-separator intermediate the feed-pump and the boiler, substantially as described.

4. In a condensing-engine plant, the combination of a vacuum-pump, a vessel having vertically-disposed bafflers arranged to alternately direct the course of the fluid up and down and connected at one end with said pump, means for drawing off fluid from near the top of said vessel, a tank connected with said vessel, a residue-outlet from said tank arranged to take fluid from near the top thereof, and a feed-pump connected with said tank, with an oil-separator intermediate the feed-pump and the boiler, substantially as described.

5. In a condensing-engine plant, the combination of a vacuum-pump, a vessel having vertically-disposed bafflers arranged to alternately direct the course of the fluid up and down and connected at one end with said pump, means for drawing off fluid from near the top of said vessel, a tank connected with said vessel, a residue-outlet from said tank arranged to take fluid from near the top thereof, and a feed-pump connected with said tank, with a heater and an oil-separator intermediate the feed-pump and the boiler, substantially as described.

6. In a condensing-engine plant, the combination of a vacuum-pump, a vessel having vertically-disposed bafflers arranged to alternately direct the course of the fluid up and down and connected at one end with said pump, means for drawing off fluid from near the top of said vessel, a tank connected with said vessel, a residue-outlet from said tank arranged to take fluid from near the top thereof, and a feed-pump connected with said tank, with a heater, and an oil-separator comprising two communicating chambers one over the other, said heater and separator being intermediate the feed-pump and the boiler, substantially as described.

7. In a condensing-engine plant, the combination of a vacuum-pump, a vessel having vertically-disposed bafflers arranged to alternately direct the course of the fluid up and down and connected at one end with said pump, means for drawing off fluid from near the top of said vessel, a tank connected with said vessel, a residue-outlet from said tank arranged to take fluid from near the top thereof, with a heater and an oil-separator intermediate the feed-pump and the boiler, substantially as described.

8. In a condensing-engine plant, the combination of a vacuum-pump, a vessel having vertically-disposed bafflers arranged to alternately direct the course of the fluid up and down and connected at one end with said pump, means for drawing off fluid from near the top of said vessel, a tank connected with said vessel, a residue-outlet from said tank arranged to take fluid from near the top thereof, with a heater, and an oil-separator comprising two communicating chambers one over the other, said heater and separator being intermediate the feed-pump and the boiler, substantially as described.

9. The method, substantially as hereinbefore described, of separating oil from water, which consists in causing oily water to flow up and down, whereby oil separates and collects from the fluid where it changes its course from up to down, drawing off and heating the residuum or the water and the oil remaining therein, then causing the heated fluid to flow upwardly, and drawing off the water at a point below the top part of the body, whereby heavier oils are separated from the water and collected.

10. In a condensing-engine plant, the combination of means for separating the lighter oils from the condensed steam, a feed-pump, a heater, and a separator for the heavy oils said separator comprising two vessels placed one over the other or one higher than the other and in communication with each other by a relatively small opening or conduit.

11. In an oil-separator, the combination of two vessels placed one higher than the other, an upwardly-extending inlet-pipe within the lower vessel and terminating above the middle part thereof, a discharge near the lower side or bottom of said lower vessel, and a constricted opening between the top of the lower vessel and the upper vessel.

12. In an oil-separator, the combination of two closed vessels placed one higher than the other, an inlet-pipe terminating within the lower vessel above the middle part thereof and discharging upwardly, a discharge at or near the bottom of said lower vessel, a constricted opening between the top part of the lower vessel and the lower part of the upper vessel, and a discharge-pipe connecting with the upper vessel near or at the upper part or top thereof.

13. In a condensing-engine plant, the combination with two closed vessels placed one higher than the other, an upwardly-discharging inlet-pipe terminating within the lower vessel above the middle portion thereof, a discharge-pipe connected with the lower vessel below said inlet-pipe end, a constricted opening between the top part of the lower vessel and the lower part of the upper vessel, and a discharge connected with the lower vessel below said inlet, of a heater with which the inlet-pipe is connected, and a feed-pump.

Signed at New York city, in the county of New York and State of New York, this 25th day of November, A. D. 1898.

AMOS ANDREWS.

Witnesses:
CHAS. A. BRODEN,
RICHARD W. BARKLEY.